(12) United States Patent
Indei

(10) Patent No.: US 8,570,542 B2
(45) Date of Patent: Oct. 29, 2013

(54) INFORMATION RECORDING DEVICE, INFORMATION RECORDING METHOD AND COMPUTER READABLE MEDIUM FOR STORING FILE INFORMATION IN FIRST OR SECOND STORAGE AREAS BASED ON STORAGE AREA CAPACITY

(75) Inventor: Shigeo Indei, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 412 days.

(21) Appl. No.: 12/883,858

(22) Filed: Sep. 16, 2010

(65) Prior Publication Data

US 2011/0222093 A1 Sep. 15, 2011

(30) Foreign Application Priority Data

Mar. 10, 2010 (JP) ................................ 2010-053070

(51) Int. Cl.
*G06F 3/12* (2006.01)
(52) U.S. Cl.
USPC ........................................................ 358/1.13
(58) Field of Classification Search
None
See application file for complete search history.

(56) References Cited

U.S. PATENT DOCUMENTS

2003/0234958 A1* 12/2003 Fritz et al. .................... 358/1.16

FOREIGN PATENT DOCUMENTS

JP 2006-221753 A 8/2006

* cited by examiner

*Primary Examiner* — Jeremiah Bryar
(74) *Attorney, Agent, or Firm* — Sughrue Mion, PLLC (57) ABSTRACT

An information recording method includes: acquiring plural pieces of file information; acquiring plural pieces of additional information accompanying the acquired pieces of file information; storing the acquired pieces of file information in first or second storage area each having a predetermined capacity for storing the file information. If the pieces of additional information on the acquired pieces of file information indicate the acquired pieces of file information are required to be stored in time order, the acquired pieces of file information are stored into the first storage area in the order of pieces of time information contained in the respective pieces of additional information. If a file capacity of one of the acquired pieces of file information is larger than an empty capacity of the first storage area, the one of the acquired pieces of file information is stored into the second storage area.

5 Claims, 9 Drawing Sheets

211: DISTRIBUTION CONDITION INFORMATION

| AREA ID (211a) | DIVISION AREA CAPACITY (211b) | CONDITION (211c) |
|---|---|---|
| A | 4.7GB | SYSTEM FILE BACKUP (SYSTEM CAPACITY PRECEDENCE) |
| B | 25GB | IMAGE HISTORY INFORMATION (SALES UNIT 3, IN TIME ORDER) |
| C | 640MB | ERROR HISTORY INFORMATION (PRINTER 1, IN TIME ORDER) |
| ... | ... | ... |

FIG. 4

212: REMAINING CAPACITY INFORMATION

| AREA ID (212a) | DIVISION AREA ID (212b) | REMAINING CAPACITY (212c) |
|---|---|---|
| A | $a_1$ | N.G. |
| A | $a_2$ | 2.0GB |
| A | $a_3$ | 4.7GB |
| ⋮ | ⋮ | ⋮ |
| B | $b_1$ | 5.0GB |
| B | $b_2$ | 25GB |
| ⋮ | ⋮ | ⋮ |

211A: DISTRIBUTION CONDITION INFORMATION

| AREA ID 211a | DIVISION AREA CAPACITY 211b | CONDITION 211c |
|---|---|---|
| A | 4.7GB | VIDEO DATA (CHILD X) |
| B | 25GB | VIDEO DATA (SUMMER HOLIDAY TRIP, IN TIME ORDER) |
| C | 640MB | PHOTO DATA (FUJI MOUNTAIN CLIMBING, IN TIME ORDER) |
| ... | ... | ... |

INFORMATION RECORDING DEVICE, INFORMATION RECORDING METHOD AND COMPUTER READABLE MEDIUM FOR STORING FILE INFORMATION IN FIRST OR SECOND STORAGE AREAS BASED ON STORAGE AREA CAPACITY

CROSS-REFERENCE TO RELATED APPLICATIONS

This application is based on and claims priority under 35 USC 119 from Japanese Patent Application No. 2010-053070 filed on Mar. 10, 2010.

BACKGROUND

Technical Field

This invention relates to an information recording device, an information recording method and a computer readable medium.

SUMMARY

According to an aspect of the invention, an information recording device includes: an information acquiring unit that acquires a plurality of pieces of file information; an additional information acquiring unit that acquires a plurality of pieces of additional information accompanying the acquired pieces of file information; a first storage area that has a predetermined capacity for storing the file information; a second storage area that has the predetermined capacity for storing the file information; and an information storing unit that stores the acquired pieces of file information in the first or second storage area. If the pieces of additional information on the acquired pieces of file information indicate the acquired pieces of file information are required to be stored in time order, the information storing unit stores the acquired pieces of file information into the first storage area in the order of pieces of time information contained in the respective pieces of additional information. If a file capacity of one of the acquired pieces of file information is larger than an empty capacity of the first storage area, the information storing unit stores the one of the acquired pieces of file information into the second storage area.

BRIEF DESCRIPTION OF THE DRAWINGS

Exemplary embodiment(s) of the present invention will be described in detail based on the following figures, wherein.

DETAILED DESCRIPTION

First Exemplary Embodiment (Configuration of Print Controlling System)

Figure 1:
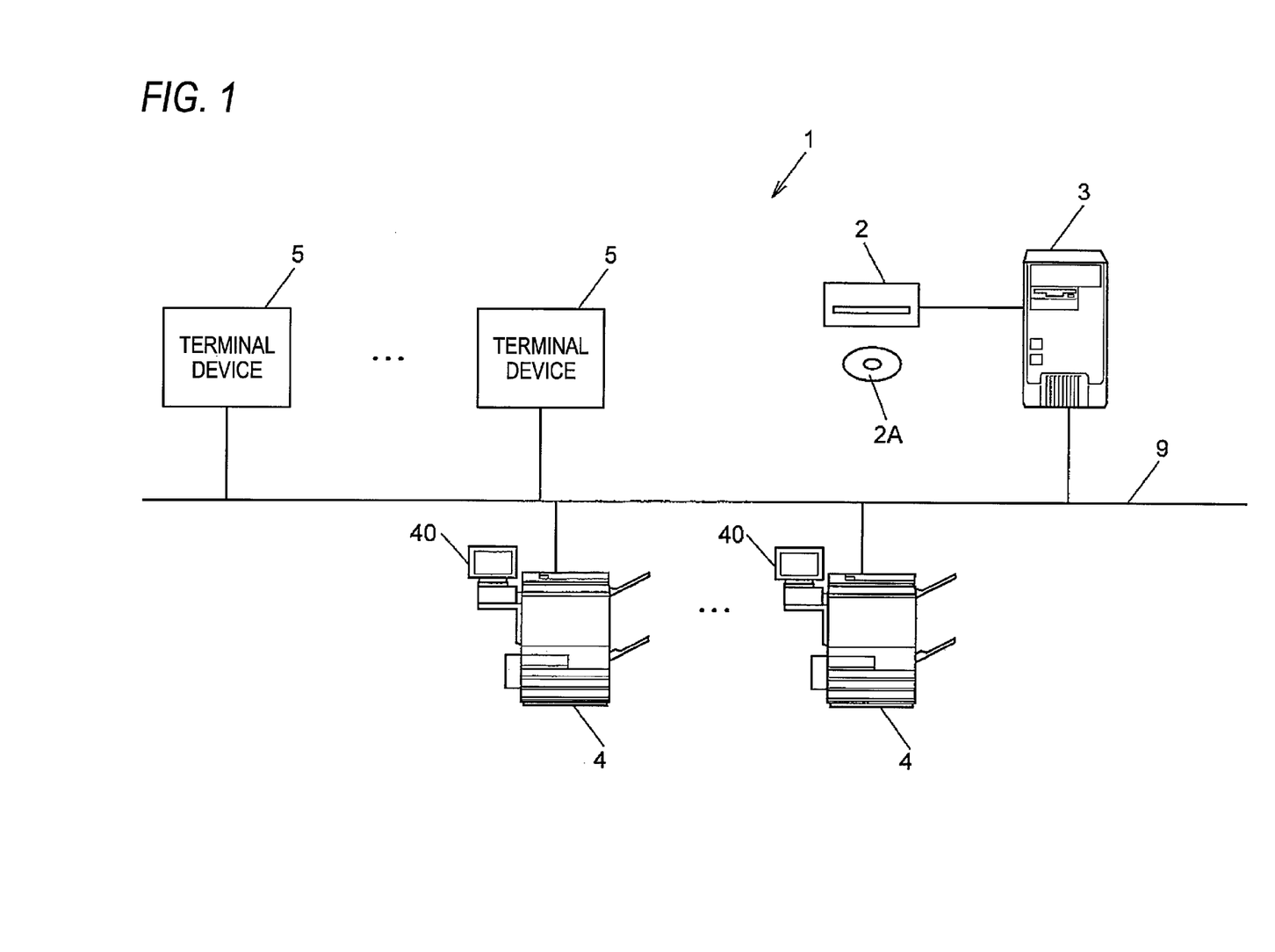
FIG. 1 is a drawing to show an example of the configuration of a print controlling system according to a first exemplary embodiment of the invention.

FIG. 1 is a drawing to show an example of the configuration of a print controlling system according to a first exemplary embodiment of the invention.

A print controlling system 1 includes a print controlling server 3, a multiple function device 4, and a terminal device 5 which are connected via a network such as a LAN (Local Area Network). In the print controlling system 1, an information recording device 2 is connected to the print controlling server 3 by a USB (Universal Serial Bus) cable or a LAN cable. The multiple function device 4 and the terminal device 5 are shown each as a single unit in the figure, but a plurality of devices may be provided. The network may be wired network or may be wireless network. The information recording device 2 may be connected to the network 9 without being directly connected to the print controlling server 3. The information recording device 2 may be a built-in device of the print controlling server 3.

The information recording device 2 acquires information of a history of print images, a history of print errors, etc., each stored in a storage unit of the print controlling server 3. The information recording device 2 stores the information as a unity of information suited to a recording medium 2A based on a predetermined rule. And, the information recording device 2 writes the stored information to the recording medium 2A of a CD (Compact Disc), a DVD (Digital Versatile Disc), a Blu-ray® disk, etc.

Upon reception of a print job from the terminal device 5, the print controlling server 3 generates print information that can be printed by the multiple function device 4 based on the print job, and transmits the print information to the multiple function device 4. When print processing based on the print information is completed in the multiple function device, the print controlling server 3 generates compressed image information of PDF, JPEG, etc., corresponding to the print information and records as history information of the print image with being associated with (i) time information at which the print processing was performed, (ii) identification information of the multiple function device 4 processing the print job, (iii) identification information of the terminal device 5 generating the print job, and (iv) identification information of user giving a command of the print job. The "print job" contains specifying information of a printer for executing printing, printing size, printing paper, etc., original data to create print information, etc., together with a print instruction.

When an authentication unit 40 of the multiple function device 4 reads card identification information for identifying the user from an IC card, etc., the print controlling server 3 accepts and authenticates the card identification information. When the card identification information is authenticated, the print controlling server 3 transmits information for permitting the user to use the multiple function device to the multiple function device 4, and records the operation executed in the multiple function device 4 by use of the user as history information.

The multiple function device 4 has the authentication unit 40 for reading the card identification information of an IC card, a printing unit for executing printing based on the print information received from the print controlling server 3 and outputting printed material, a scanning unit for optically scanning the plane of a document, etc., a communication function unit having a communication function of facsimile, etc., and a display unit of an LCD (Liquid Crystal Display), etc. The multiple function device 4 is not only a single unit, but also a device made up of plural units corresponding to the functions. As the scanning method of reading the card identification information from an IC card by the authentication unit 40, any of a magnetic, optical, or electromagnetic scanning method may be used.

The terminal device 5 has a display unit of an LCD, etc., and an operation unit of a keyboard, a mouse, etc., generates a print job in response to the operation of the user for the operation unit, and transmits the print job to the print controlling server 3.

Next, the devices described above will be discussed in detail.

(Information Recording Device)

Figure 2:
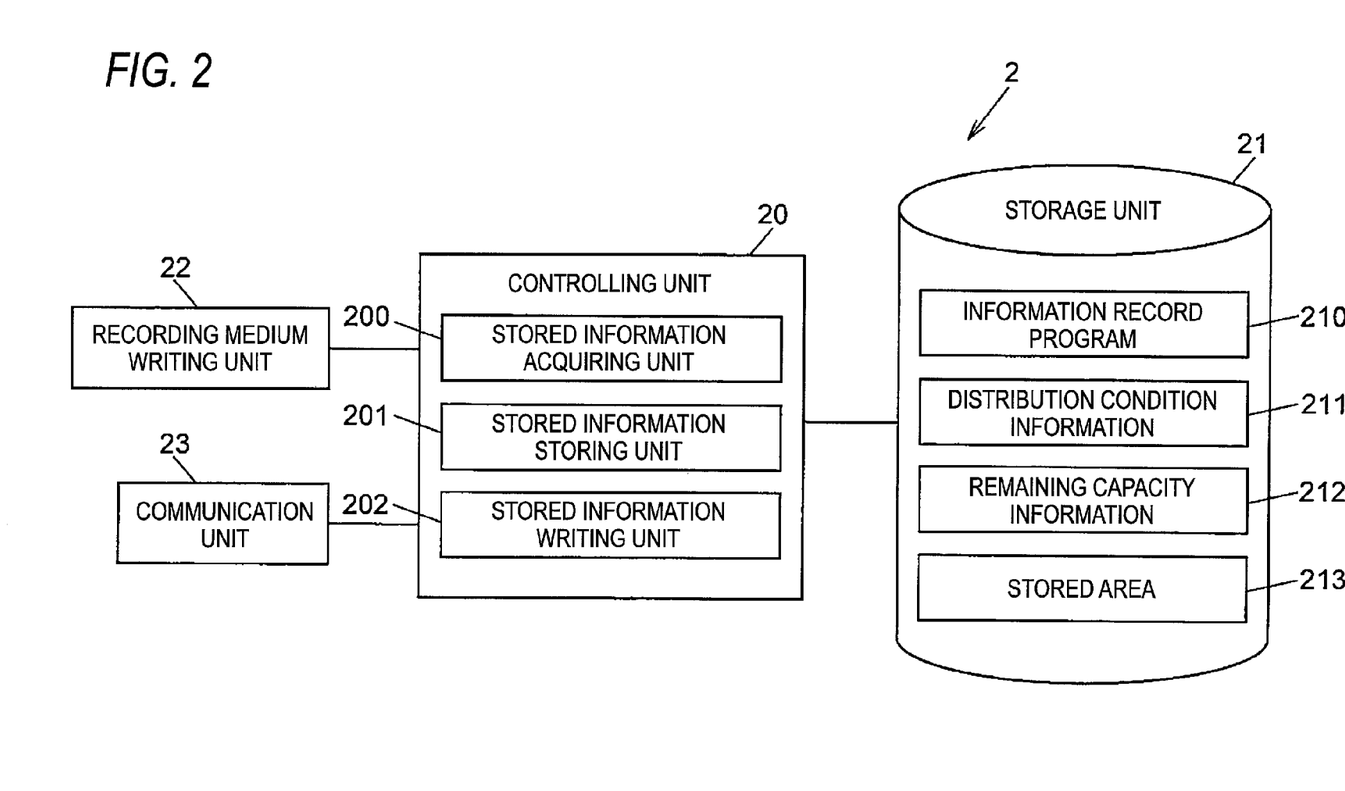
FIG. 2 is a block diagram to show an example of the configuration of an information recording device.

FIG. 2 is a block diagram to show an example of the configuration of the information recording device 2.

The information recording device 2 has a controlling unit 20 for controlling units made up of a CPU (Central Processing Unit), memory, etc., and executing various programs, a storage unit 21 made up of storage devices of an HDD (Hard Disk Drive), flash memory, etc., for storing information, and a communication unit 23 for communicating with the print controlling server 3 through a USB cable, a LAN cable, etc.

The controlling unit 20 executes an information record program 210 described later, thereby functioning as a stored information acquiring unit 200, a stored information storing unit 201, a stored information writing unit 202, and the like.

The stored information acquiring unit 200 acquires file information and additional information accompanying the file information from an external device of the print controlling server 3, etc. The additional information is information of a header, tag, etc., of the file information and contains the descriptions of time information, data capacity, identification information of a creator, a device, etc., and the like.

The stored information storing unit 201 distributes the plural pieces of file information acquired by the stored information acquiring unit 200 based on a predetermined condition and stores the plural pieces of file information in a stored area 213 of the storage unit 21.

The stored information writing unit 202 writes the file information stored in the stored area 213 of the storage unit 21 to the recording medium 2A for each division area having a predetermined storage capacity described later.

The storage unit 21 stores the information record program 210 for causing the controlling unit 20 to function as the units 200 to 202 described above. And, the storage unit 2I stores various pieces of information such as (i) distribution condition information 211 indicating a condition for the stored information storing unit 201 to distribute the plural pieces of file information acquired by the stored information acquiring unit 200, (ii) remaining capacity information 212 indicating the remaining capacity of each division area contained in the stored area 213, and (iii) information of the stored area 213 where the plural pieces of file information having been distributed by the stored information storing unit 201 are stored into the respective division areas.

Figure 3:
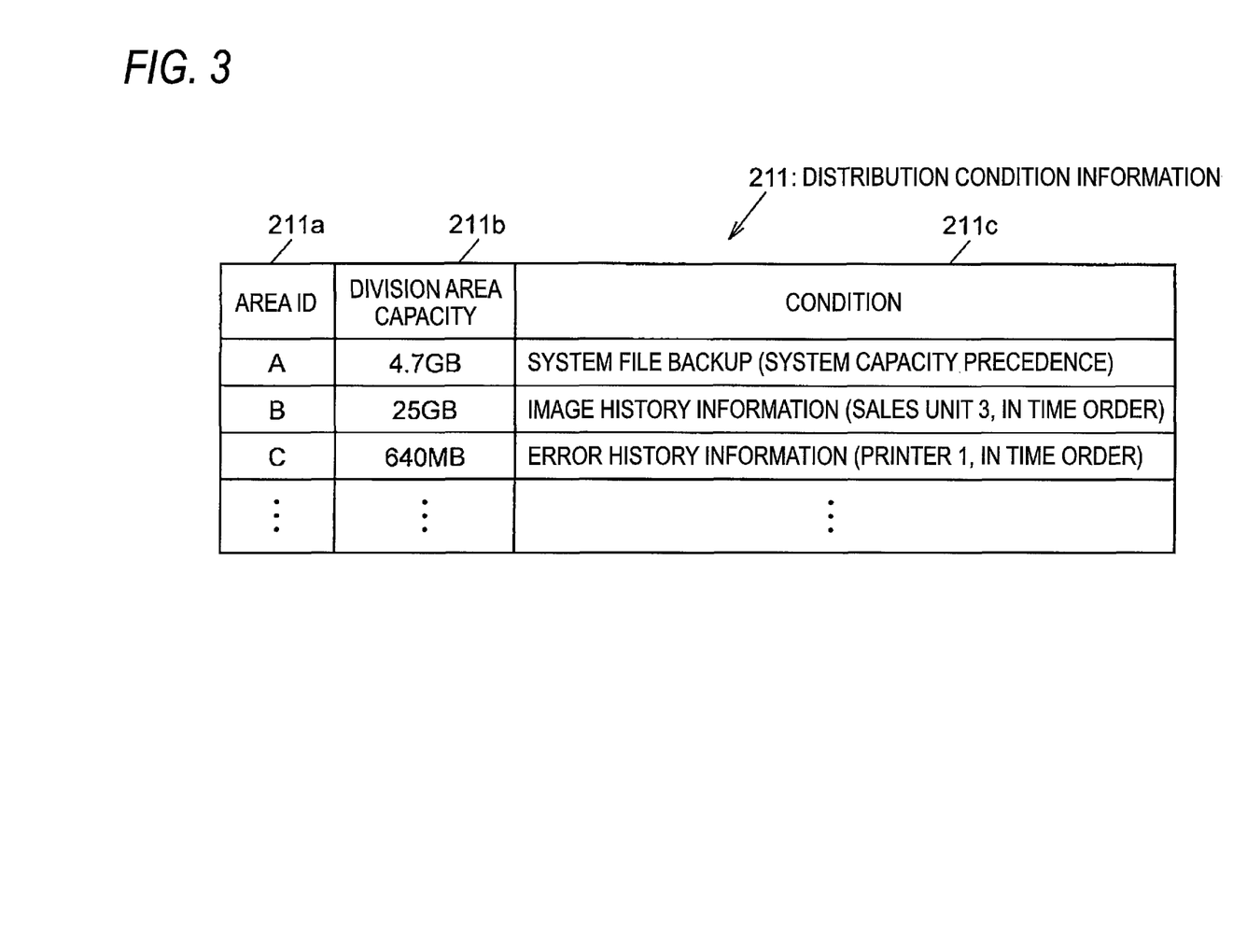
FIG. 3 is a drawing to show an example of distribution condition information retained in a storage unit.

FIG. 3 is a drawing to show an example of the distribution condition information 211 retained in the storage unit 21.

The distribution condition information 211 has an area ID column 211a indicating plural storage areas provided in the stored area 213 described later, a division area capacity column 211b indicating the capacity of each of the division areas provided in each storage area, and a condition column 211c indicating the condition for the stored information storing unit 201 to distribute the plural pieces of file information into the respective storage areas.

Figure 4:
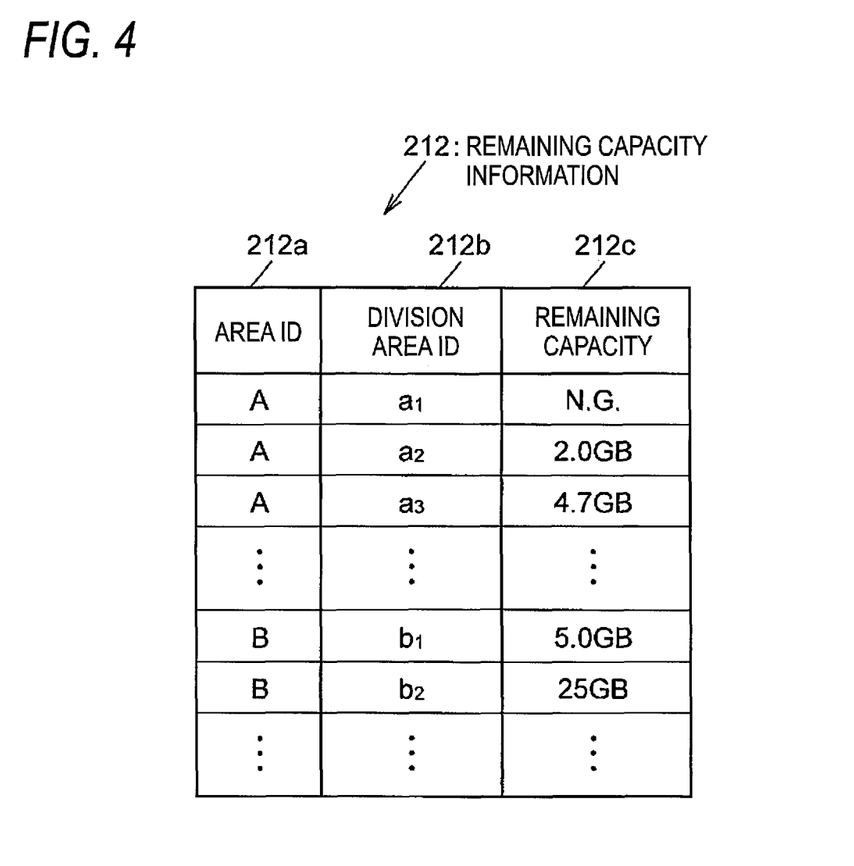
FIG. 4 is a drawing to describe an example of remaining capacity information retained in the storage unit.

FIG. 4 is a drawing to describe an example of the remaining capacity information 212 retained in the storage unit 21.

The remaining capacity information 212 has an area ID column 212a indicating plural storage areas provided in the stored area 213, a division area ID column 212b indicating plural division areas provided in each storage area, and a remaining capacity column 212c indicating the remaining capacity relative to the division area capacity of each division area.

Figure 5:
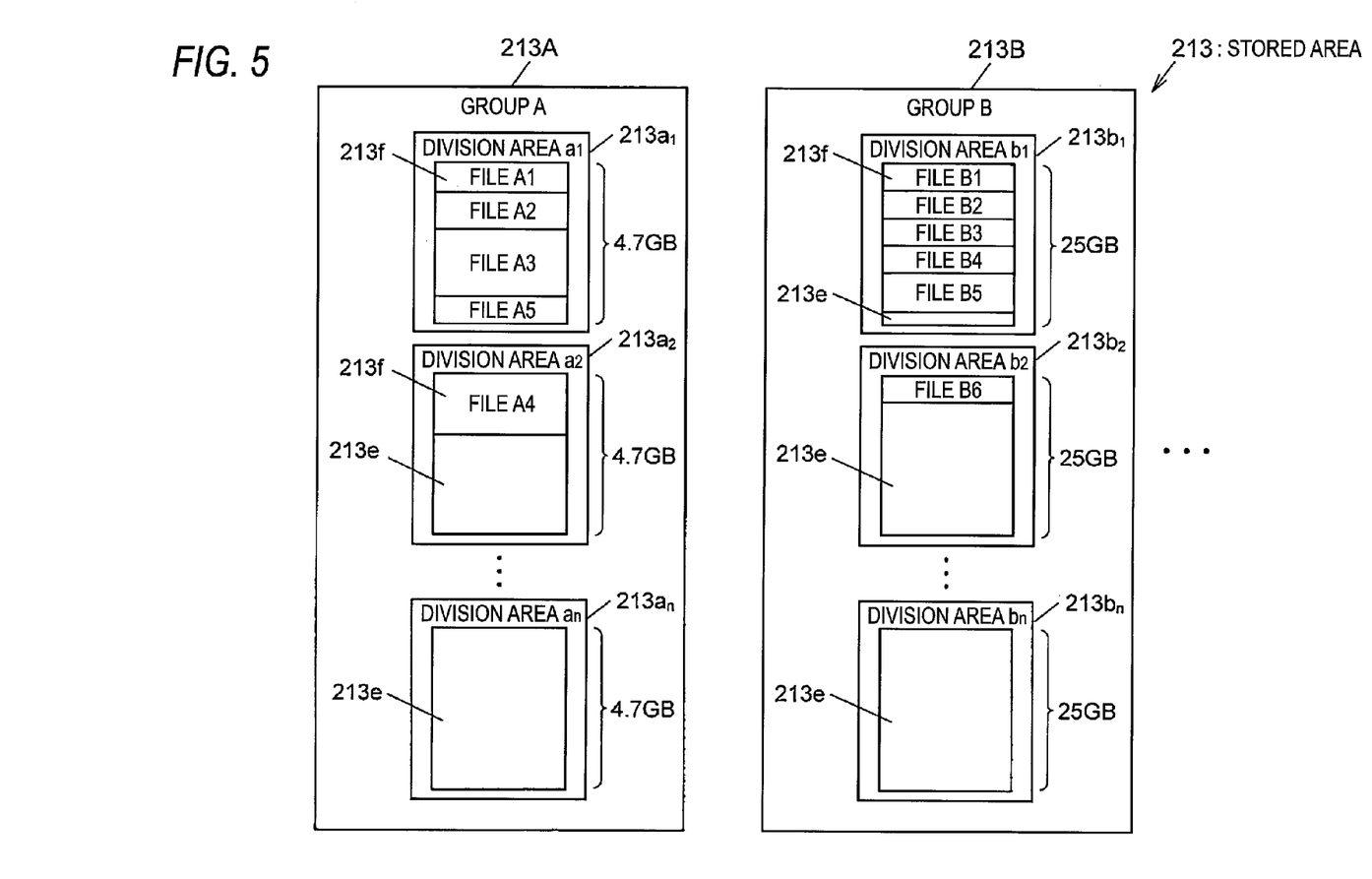
FIG. 5 is a drawing to describe an example of a stored area of the storage unit.

FIG. 5 is a drawing to describe an example of the stored area 213 of the storage unit 21.

The stored area 213 is made up of storage areas 213A, 213B, ... set according to the area ID column 211a of the distribution condition information 211. The storage area 213A is a storage area to store file information written to a DVD and is made up of division areas $213a_1, 213a_2, \ldots 213a_n$ each having a capacity of 4.7 GB. Each of division areas $213a_1, 213a_2, 213a_n$ has at least one of a storage area 213f in which one or two or more pieces of file information are stored and an empty area 213e in which no piece of file information is stored.

Likewise, the storage area 213B is a storage area for storing file information written to a Blu-ray disk, for example, and is made up of division areas $213b_1, 213b_2, \ldots 213b_n$ each having a capacity of 25 GB. One or two or more pieces of file information can be stored in each division area.

(Print Controlling Server)

Figure 6:
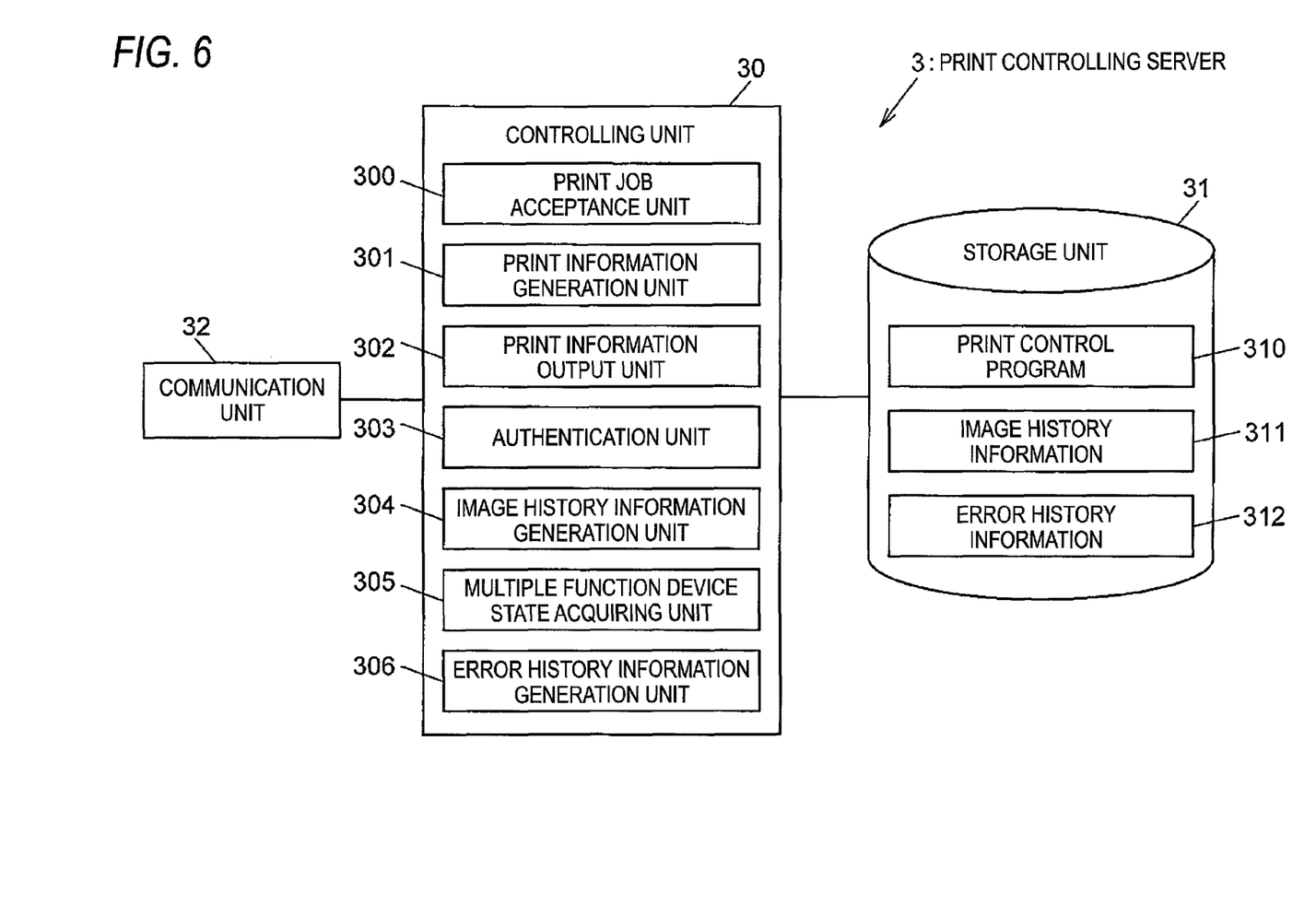
FIG. 6 is a block diagram to show an example of the configuration of a print controlling server.

FIG. 6 is a block diagram to show an example of the configuration of the print controlling server 3.

The print controlling server 3 has a controlling unit 30 made up of CPU, memory, etc., and executing various programs, a storage unit 31 made up of storage devices of HDD, flash memory, etc., for storing the above-mentioned programs, system files of a setup file, etc., referenced in executing the program, and information of a print job for performing processing, and a communication unit 32 for communicating with an external device through the network 9.

The controlling unit 30 functions as a print job acceptance unit 300, a print information generation unit 301, a print information output unit 302, an authentication unit 303, an image history information generation unit 304, a multiple function device state acquiring unit 305, a error history information generation unit 306, etc., by executing a print control program 310.

The print job acceptance unit 300 receives and accepts a print job transmitted from the terminal device 5 through the network 9.

The print information generation unit 301 generates print information in a data format that can be printed by the multiple function device 4 based on the print job received by the print job acceptance unit 300.

The print information output unit 302 outputs (transmits) the print information generated by the print information generation unit 301 to the multiple function device 4 specified in the print job through the network 9.

When an IC card, etc., is read in the authentication unit 40 provided in the multiple function device 4, the authentication unit 303 receives and accepts card identification information of the IC card transmitted through the network 9, and authenticates as to whether use of the multiple function device 4 is permitted on the basis of the card identification information. The authentication unit 303 returns the authentication result to the multiple function device 4 and places the multiple function device 4 in a usable state.

Upon reception of a message indicating that the print information output by the print information output unit 302 is normally subjected to print processing in the multiple function device 4 of the output destination from the multiple function device 4, the image history information generation unit 304 previously acquires a copy of the print information output by the print information output unit 302, compresses it to generate compressed image information of JPEG, PDF, etc., and stores the compressed image information in the storage unit 31 as image history information 311.

Upon reception of a message indicating that the function of copy, scan, FAX, etc., is used in the multiple function device 4 from the multiple function device 4, the image history information generation unit 304 acquires image information acquired in copy, scan, or FAX from the multiple function device 4, compresses the image information to generate compressed image information of JPEG, PDF, etc., and stores the compressed image information in the storage unit 31 as image history information 311. The image history information 311 contains the creation time of the image information, the identification information of the multiple function device 4, etc., in addition to the compressed image information.

The multiple function device state acquiring unit 305 acquires the state of the multiple function device 4, for example, waiting, printing, occurrence of print jam (paper jam), or paper supply running out state from the multiple function device 4.

The error history information generation unit 306 stores a state corresponding to an error in the state of the multiple function device 4 acquired by the multiple function device state acquiring unit 305 in the storage unit 31 as error history information 312. The error history information 312 contains the occurrence time of the error, the identification information of the multiple function device 4, etc., in addition to the error content.

The storage unit 31 stores the print control program 310 for causing the controlling unit 30 to operate as the units 300 to 306 described above, and various pieces of information such as the image history information 311 and the error history information 312.

(Operation of Print Controlling System)

An operation example of the print controlling system 1 will be discussed below with reference to the accompanying drawings.

(1) History Recording Operation

To begin with, the user using the terminal device 5 operates the operation unit of the terminal device 5 for printing, selects a document to be printed, and performs printing operation. The terminal 5 generates a print job in response to the operation of the user, transmits the print job to the print controlling server 3.

The print job acceptance unit 300 of the print controlling server 3 receives and accepts the print job transmitted from the terminal 5 through the network 9. Next, the print information generation unit 301 generates print information in the data format that can be printed by the multiple function device 4 based on the print job received by the print job acceptance unit 300.

Next, the print information output unit 302 outputs the print information generated by the print information generation unit 301 to the multiple function device 4 specified in the print job. The multiple function device 4 receives and accepts the print information transmitted from the print controlling server 3 through the network 9, prints on a sheet based on the print information, and outputs a printed material. Upon completion of normal print processing, the multiple function device 4 transmits a message indicating that the print processing is normally completed to the print controlling server 3.

Upon reception of a message indicating that the print processing is normally completed in the multiple function device 4 from the multiple function device 4, the image history information generation unit 304 compresses a copy of the print information previously acquired from the print information output unit 302 to generate compressed image information of JPEG, PDF, etc., and stores the compressed information in the storage unit 31 as the image history information 311.

To use the function of print, scan, FAX, etc., the user using the multiple function device 4 causes the authentication unit 40 of the multiple function device 4 to read an IC card. The authentication unit 40 of the multiple function device 4 reads the card identification information from the IC card and transmits the read card identification information to the print controlling server 3.

The authentication unit 303 of the print controlling server 3 receives and accepts the card identification information transmitted from the multiple function device 4 through the network 9 and authenticates the card identification information as to whether use of the multiple function device 4 is permitted on the basis of the card identification information. Only card identification information registered previously is authenticated.

The authentication unit 303 returns the authentication result to the multiple function device 4. If the card identification information has been registered, the authentication unit 303 transmits information to place the multiple function device 4 in a usable state to the multiple function device 4. The multiple function device 4 enables the user to use the function of print, scan, FAX, etc., on the basis of the received information from the print controlling server 3.

Next, the user uses the function of print, scan, FAX, etc., in the multiple function device 4, and the multiple function device 4 operates in response to operation of the user. In operation, the multiple function device 4 sequentially transmits image information, etc., acquired by the function of copy, scan, FAX, etc., together with the operation state of the multiple function device 4 to the print controlling server 3.

When the function of copy, scan, FAX, etc., is used in the multiple function device 4 and the image information is acquired in copy, scan, or FAX, the image history information generation unit 304 of the print controlling server 3 acquires the image information from the multiple function device 4, compresses the image information to generate compressed image information of JPEG, PDF, etc., and stores the compressed image information in the storage unit 31 as the image history information 311.

The multiple function device state acquiring unit 305 acquires the state of the multiple function device 4, for example, waiting, printing, occurrence of print jam (paper jam), or paper supply running out state from the multiple function device 4.

Next, the error history information generation unit 306 stores a state corresponding to an error in the state of the multiple function device 4 acquired by the multiple function device state acquiring unit 305 in the storage unit 31 as the error history information 312.

(2) Information Acquisition Operation

Figure 7:
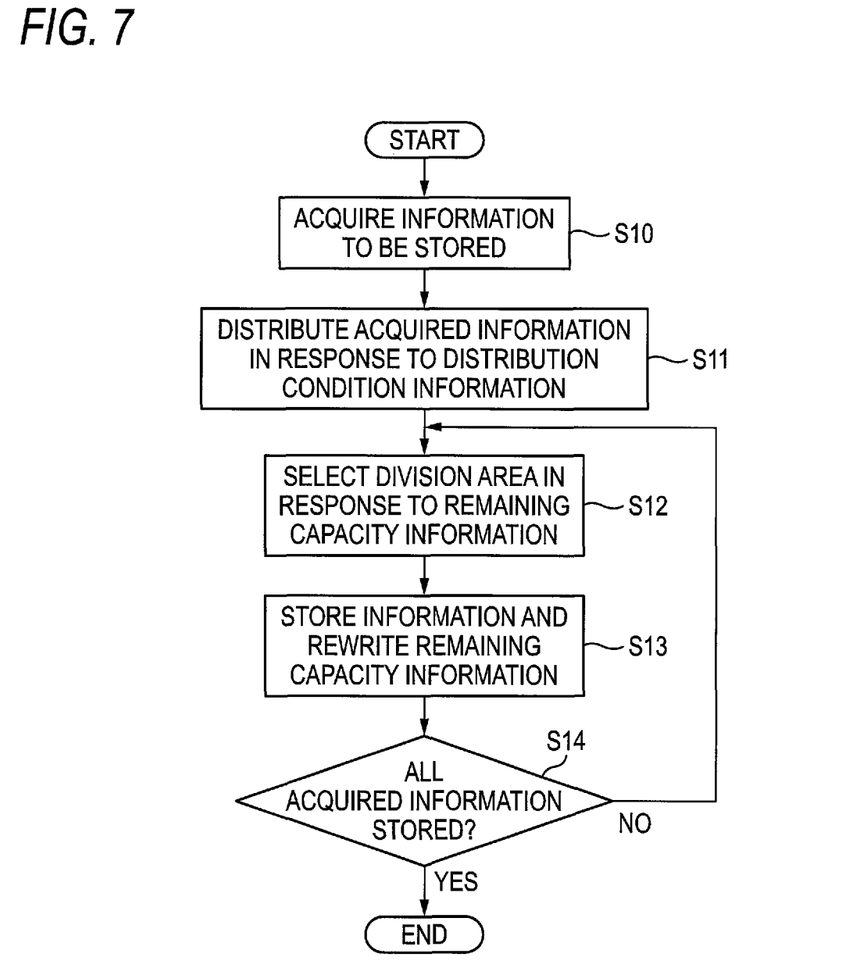
FIG. 7 is a flowchart to show an example of the operation of the information recording device.

FIG. 7 is a flowchart to show an example of the operation of the information recording device 2.

Backup processing of history information concerning print processing stored in the storage unit 31 of the print controlling server 3 will be discussed by way of example. To begin with, the stored information acquiring unit 200 of the information recording device 2 acquires a series of six files of "file B1" to "file B6" of the image history information 311, the error history information 312, and the like from the storage unit 31 of the print controlling server 3 through the communication unit 23 (S10). The information acquisition operation of the stored information acquiring unit 200 may be performed based on operation of the user or may be automatically performed on a regular basis.

Next, the stored information storing unit 201 distributes the plural pieces of file information acquired by the stored information acquiring unit 200 based on the distribution condition information 211 shown in FIG. 3 (S11). For example, if the stored information acquiring unit 200 acquires the image history information 311 and the stored information acquiring unit 200 acquires from the image history information 311 plural pieces of additional information accompanying the plural pieces of file information indicating "sales section 3", namely, if the plural pieces of identification information of users giving commands of the print jobs corresponding to "file B1" to "file B6" indicate "sales section 3," it is determined that these pieces of additional information corresponds to "image history information (sales section 3, in time order)" under the condition field 211c of the distribution condition information 211. Thus, it is determined that the plural pieces of file information of "file B1" to "file 136" are stored in time series, and the stored information storing unit 201 distributes the plural pieces of file information to the storage area 213B of the stored area 213 based on "B" under the area ID column 211a.

Next, the stored information storing unit 201 selects the division areas to store the pieces of file information based on the remaining capacity information 212 shown in FIG. 4 (S12). For example, the assigned area ID column 212a to files "file B1" to "file B6" of the image history information 311 acquired by the stored information acquiring unit 200 is "B" and thus the files "file B1" to "file B6" are stored in order in the number order of the division area ID column 212b while the remaining capacity column 212c is checked.

To store the files "file B1" to "file B6" of the image history information 311 in time series, the stored information storing unit 201 references pieces of time information of print processing contained in each file and stores the files in the storage area 213B in order based on the pieces of time information.

Processing of storing files "file B1" to "file B4" in order in the area with division area 113 "b1" and next storing "file B5" having a file capacity of 4.5 GB will be discussed. As shown in FIG. 4, the remaining capacity of the division area "b1" storing files "file B1" to "file B4" is 5.0 GB and the stored information storing unit 201 determines that "file B5" having a file capacity of 4.5 GB to be next stored can be stored, stores "file B5" in the division area "b1," and rewrites the remaining capacity column 212c changed as a result of the storing, of the remaining capacity information 212. In the example described above, "5.0 GB" is rewritten to "0.5 GB" (S13).

Next, the stored information storing unit 201 checks whether or not a file to be stored exists (S14) and if the file to be stored does not exist, the processing is terminated. If the file to be stored exists (No at S14), similar processing to that described above from step S12 is performed for the file.

If the stored information storing unit 201 determines that "file B6" having a capacity of 3.0 GB exists as the file to be stored, for example, the stored information storing unit 201 references the remaining capacity column 212c corresponding to the division area "b1" and makes a comparison between the remaining capacity and the file capacity of "file B6" to be stored. Since the remaining capacity of the division area "b1" is "0.5 GB" and the file capacity of "file B6" to be stored is "3.0 GB," the stored information storing unit 201 determines that the file cannot be stored and checks whether or not the file can be stored in the next division area "b2." The remaining capacity of the next division area "b2" is 25 GB and if it is determined that "file B6" having a file capacity of 3.0 GB, "file B6" is stored in the next storage area "b2."

If the stored information acquiring unit 200 acquires pieces of file information corresponding to "system file backup (file capacity precedence)" in the condition column 211c of the distribution condition information 211, the stored information storing unit 201 determines that the file capacity takes precedence and files are stored so as to minimize the number of division areas.

When the program stored in the storage unit 31 of the print controlling server 3 and executed in the print controlling server 3 and the system files made up of various pieces of setup information referenced by the program are hacked up, the files need not be stored in time series and thus the files are sorted for storage so that an empty space does not occur in the capacity of each division area as much as possible. The files acquired by the stored information acquiring unit 200 are "system files" and the storage area ID is determined to be "A" based on the distribution condition information 211.

To store files, the stored information storing unit 201 stores the files in order starting at the division area "a1" of storage area ID "A" while making a comparison between the remaining capacity and the file capacity of the file to be stored. In this case, the capacity takes precedence for storage. Thus, as shown in 213A in FIG. 5, "file A1," "file A2," and "file A3" are stored and next an attempt is made to store "file A4," but when an empty capacity is insufficient, a comparison is made between the later "file A5" in time series and the empty capacity. If it is determined that "file A5" can be stored, "file A5" is stored in the division area "a1." "File A4" is stored in the next division area "a2."

(3) Recording Medium Writing Operation

Next, upon reception of a request from the user or when an information amount of pieces of file information stored in the stored area 213 reaches a predetermined threshold, etc., the stored information writing unit 202 writes the stored file information to the recording medium 2A for each division area in a recording medium writing unit 22. The stored information writing unit 202 may select a write division area in response to the record capacity of the recording medium 2A or may request the user to install a recording medium having a record capacity required for the selected division area in the recording medium writing unit 22.

Second Exemplary Embodiment

Figure 8:
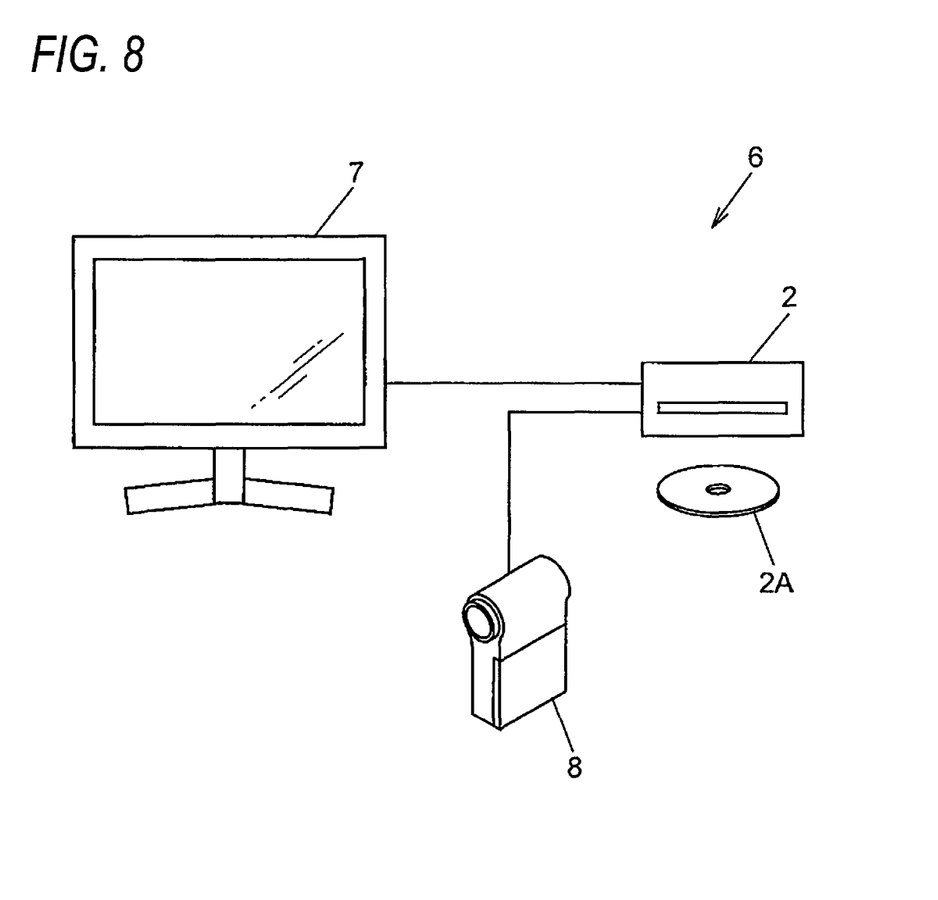
FIG. 8 is a drawing to show an example of the configuration of a video recording system according to a second exemplary embodiment of the invention.

A second exemplary embodiment distributes video information, etc., in place of history information based on additional information on the video information, etc., and writes the video information to a recording medium 2A.

FIG. 8 is a drawing to show an example of the configuration of a video recording system according to the second embodiment of the invention.

A video recording system 6 has a video record and playback device 7, an image pickup device 8, an information recording device 2, and the like.

The video record and playback device 7 has a tuner for receiving video information from a digital broadcast wave, etc., through an antenna, a playback unit for decoding and playing back the video information received by the tuner, a display unit for displaying video played back by the playback unit, a storage unit for recording and storing the video information received in response to a record request of the user, and the like.

The video record and playback device 7 register a text tag of a program name, a character string, etc., for video information based on the description of EPG (Electric Program Guide) information of a program operated or recorded by the user at the recording time, etc., of the video information. The text tag is registered in a header, etc., of the video information.

The image pickup device 8 has a lens for zooming and focusing, an image pickup element of a CMOS sensor, etc., for generating a video signal in response to pickup of a subject, a generation unit for generating video information from the video signal, a storage unit for storing the video information generated by the generation unit, etc. The image pickup device 8 may be configured so as to generate photo (image) information and store the information in the storage unit.

The image pickup device 8 registers a text tag of "summer holiday trip," "child X," etc., for example, for video information or photo information in response to operation of the user at the image pickup time or at edit time of video information or photo information.

The information recording device 2 acquires information of video information, etc., stored in the storage unit of the video record and playback device 7 and the storage unit of the image pickup device 8, stores the information as unity of information suited to the recording medium 2A based on a predetermined rule, and writes the stored information to the recording medium 2A of a CD, a DVD, Blu-ray® disk, etc.

Figure 9:
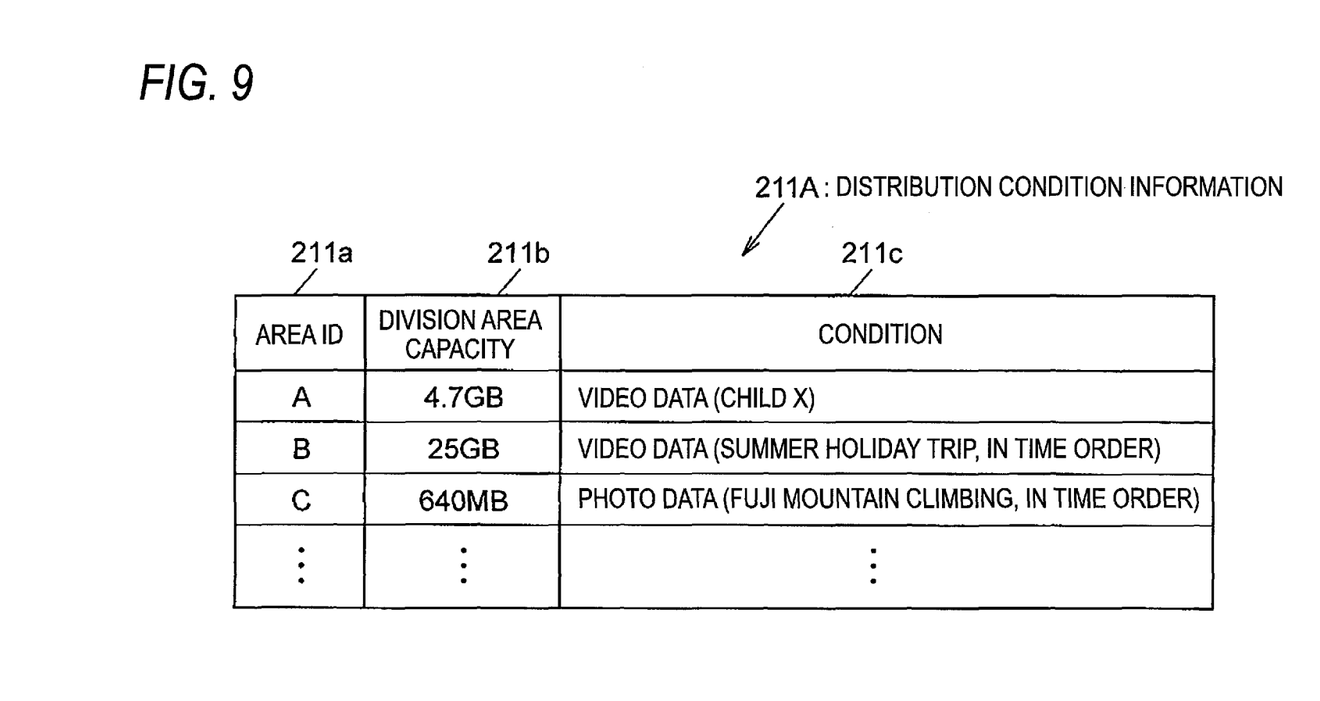
FIG. 9 is a drawing to show another example of distribution condition information retained in a storage unit of an information recording device.

FIG. 9 is a drawing to show another example of distribution condition information retained in a storage unit 21 of the information recording device 2.

Like the distribution condition information 211 in the first embodiment, distribution condition information 211A has an area ID column 211a, a division area capacity column 211b, and a condition column 211c; the condition column 211c changes to a condition for distributing video data or photo data.

(Operation of Video Recording System)

The stored information acquiring unit 200 of the information recording device 2 acquires file information of video information, photo information, etc., from the storage unit of the video record and playback device 7 or the image pickup device 8.

When the file information acquired from the storage unit of the video record and playback device 7 or the image pickup device 8 by the stored information acquiring unit 200 is video information and additional information on the video information has a text tag of the description corresponding to condition "video data (summer holiday trip, in timer order)" in the condition column 211c, for example, the stored information storing unit 201 stores the information in a storage area 213B of stored area 213 corresponding to a storage area B. Selection operation of a division area to store the file information is performed in a similar manner to that to store in the time order (time series) in the operation of the first embodiment.

Other Embodiments

The invention is not limited to the embodiments described above and various modifications can be made without departing from the spirit and scope of the invention. For example, if information is file information whose distribution can be defined in the condition column 211c of the distribution condition information 211, the information recording device 2 can distribute any other information than the history information or the video information and can write the information to the recording medium 2A.

The information record program and the print control program 310 used in the embodiments described above may be read from a storage medium of a CD-ROM, etc., into the storage unit in the device or may be downloaded from a server connected to a network of the Internet, etc., into the storage unit in the device. Some or all of the units 200 to 202 and the units 300 to 306 used in the embodiments described above may be implemented as hardware of an ASIC, etc.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information recording device comprising:
   an information acquiring unit that acquires a plurality of pieces of file information;
   an additional information acquiring unit that acquires a plurality of pieces of additional information accompanying the acquired pieces of file information;
   a first storage area that has a predetermined capacity for storing the acquired pieces of file information;
   a second storage area that has the predetermined capacity for storing the acquired pieces of file information; and
   an information storing unit that stores the acquired pieces of file information in the first or second storage area,
   wherein in response to the pieces of additional information accompanying the acquired pieces of file information indicating the acquired pieces of file information are required to be stored in time order, the information storing unit stores the acquired pieces of file information into the first storage area in order of pieces of time information contained in respective pieces of additional information, and
   in response to a file capacity of one of the acquired pieces of file information being larger than an empty capacity of the first storage area, the information storing unit stores the one of the acquired pieces of file information into the second storage area.

2. The information recording device according to claim 1, further comprising:
   a writing unit that writes the acquired pieces of file information stored in the first storage area to a recording medium having a storage capacity corresponding to the predetermined capacity of the first storage area in response to a writing request to the recording medium.

3. The information recording device according to claim 1, wherein the information storing unit comprises a distributing unit that distributes the acquired pieces of file information between the first storage area and the second storage area based on a predetermined condition.

4. An information recording method comprising:
   acquiring a plurality of pieces of file information;
   acquiring a plurality of pieces of additional information accompanying the acquired pieces of file information;

storing the acquired pieces of file information in a first storage area or a second storage area, each having a predetermined capacity for storing the acquired pieces of file information, wherein in response to the pieces of additional information accompanying the acquired pieces of file information indicating the acquired pieces of file information are required to be stored in time order, the acquired pieces of file information are stored into the first storage area in order of pieces of time information contained in respective pieces of additional information, and in response to a file capacity of one of the acquired pieces of file information being larger than an empty capacity of the first storage area, the one of the acquired pieces of file information is stored into the second storage area.

5. A non-transitory computer readable medium storing a program causing a computer to execute a process for distributing a plurality of pieces of file information, the process comprising:

acquiring the plurality of pieces of file information;

acquiring a plurality of pieces of additional information accompanying the acquired pieces of file information;

storing the acquired pieces of file information in a first storage area or a second storage area, each having a predetermined capacity for storing the acquired pieces of file information, wherein in response to the pieces of additional information accompanying the acquired pieces of file information indicating the acquired pieces of file information are required to be stored in time order, the acquired pieces of file information are stored into the first storage area in order of pieces of time information contained in respective pieces of additional information, and in response to a file capacity of one of the acquired pieces of file information being larger than an empty capacity of the first storage area, the one of the acquired pieces of file information is stored into the second storage area.

* * * * *